Figure 1:
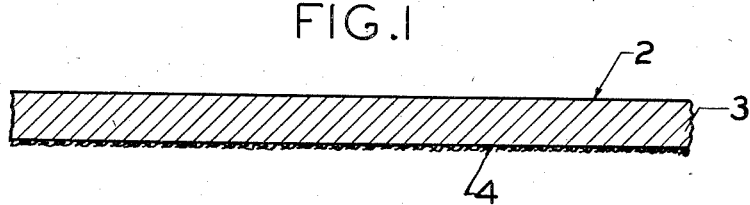

May 15, 1951     W. STUBBLEBINE     2,552,600

FLOOR AND WALL COVERING

Filed March 10, 1945

INVENTOR.

Patented May 15, 1951

2,552,600

UNITED STATES PATENT OFFICE 2,552,600

FLOOR AND WALL COVERING

Warren Stubblebine, Lancaster, Pa., assignor to Armstrong Cork Company, Lancaster, Pa., a corporation of Pennsylvania Application March 10, 1945, Serial No. 582,128

6 Claims. (Cl. 260—19)

This invention relates to floor and wall coverings and, more particularly, to a floor and wall covering composed of a flexible, alkali-resistant, decorative wear surface including a binder composed of linoleum cement, a plasticized polyvinyl butyral and a heat-convertible, oil-soluble, phenolic resin preferably integrally united with a backing or carrier, such as burlap, felt, canvas, and the like.

The chief object of my invention is to provide a new and novel floor and wall covering which is tough, flexible, resilient, and resistant to indentation. An object of my invention is to provide a floor and wall covering which is resistant to water, dilute alkalies, and soap. A further object is to provide a floor and wall covering which may be manufactured on equipment customarily employed in the manufacture of linoleum and which may be manufactured without being subjected to the extensive stoving or curing required with floor and wall coverings of the linoleum type. A still further object is to provide a method of making a floor and wall covering possessing characteristics of toughness, flexibility, resilience, solvent resistance, and which exhibits a high degree of elastic recovery.

The floor and wall covering of my invention comprises a polyvinyl butyral, a plasticizer for the polyvinyl butyral, a substantially completely oxidized siccative oil-resin gel, such as linoleum cement, a heat-convertible, oil-soluble, modified phenolic resin, suitable pigments and fillers. The polyvinyl butyral resin may not contain more than 20% residual polyvinyl alcohol for I have found an amount of residual polyvinyl alcohol greater than 20% decreases materially the alkali resistance of the covering prepared in accordance with my invention.

The heat-convertible cross-linking agent for the polyvinyl butyral and linoleum cement must be so selected as not to impair the resiliency and flexibility of the plasticized polyvinyl butyral in the final covering.

I have found the proportions in which the respective ingredients are included in the compound are critical. Not more than 25 parts by weight of oil-soluble phenol-aldehyde resin based on each 100 parts by weight of binder should be used. The amount of plasticizer must fall within the range of 25 to 50 parts by weight based on each 100 parts by weight of polyvinyl butyral. The amount of filler present in the compound should fall within the range of 150 to 500 parts by weight to each 100 parts by weight of binder.

In the manufacture of my preferred floor and wall covering, the plasticizer is mixed with the polyvinyl butyral and milled on a hot mill until the polyvinyl butyral is substantially completely plasticized. The linoleum cement is then added to the mass. After addition of the linoleum cement is complete, fillers and pigments are mixed therein. When the mixing is complete, the temperature of the mass is reduced substantially and the oil-soluble phenol-aldehyde resin added thereto and milled throughout the mass. The mass may be disposed by any suitable means on a backing of felt, burlap or canvas, for example, and is heated for a sufficient time to render the phenol-aldehyde resin substantially insoluble and infusible and to cure the linoleum cement. The covering is then ready for use. The uncured material is somewhat thermoplastic but the step of heating reduces the thermoplasticity considerably and increases the resistance of the compound to the action of water, dilute alkalies, soap, and the like.

In order to aid in a full and complete understanding of my invention, the following examples are given for purposes of illustration:

Example 1

| | Parts by weight |
|---|---|
| Polyvinyl butyral | 75 |
| Linoleum cement | 75 |
| Tricresyl phosphate | 30 |
| Oil-soluble phenol-aldehyde resin | 15 |
| Cotton flock | 10 |
| "Kalvan" | 250 |

In the manufacture of the floor covering, the tricresyl phosphate is mixed with polyvinyl butyral and permitted to soak for about an hour. The mix is then charged onto a hot mill, heated to a temperature of about 225° F., and milled until plasticization is substantially complete. The linoleum cement is then thoroughly mixed into the plasticized polyvinyl butyral. The "Kalvan," cotton flock, and pigment are then mixed into the composition. The mass is permitted to cool to approximately 150° to 160° F. and the oil-soluble phenol-aldehyde resin added while maintaining the mass at such temperature. Preferably, the mass is then calendered upon a support or backing, such as felt, burlap, canvas, or the like. The sheet of floor or wall covering so formed is then disposed in a stove or oven and heated for a sufficient time to convert the oil-soluble phenol-aldehyde resin to a substantially infusible and insoluble stage and to cure the linoleum cement. The oil-soluble phenol-aldehyde resin serves to cross-link the polyvinyl butyral and apparently exerts the same type of effect on the linoleum cement, rendering it less readily attacked by alkalies. The heating or curing period may comprise about 18 to 36 hours at approximately 195° F.

The polyvinyl butyral used in the above compound should not contain more than 20% residual polyvinyl alcohol in order to possess satisfactory resistance to water, acids, and dilute alkalies. Preferably, the polyvinyl butyral contains less than 10% residual polyvinyl alcohol and I have found that Du Pont grade VF-7100 is satisfactory. The oil-soluble phenol-aldehyde resin must be so selected as not to detract from the resiliency and flexibility of the polyvinyl butyral. It serves as a reinforcing means and as a cross-linking agent for the plasticized polyvinyl butyral and the linoleum cement. Any heat-reactive, oil-soluble, phenol-aldehyde resin may be used such as the resin formed by the reaction of para-tertiary-butyl phenol and formaldehyde.

The linoleum cement used in the above compound consists of an oxidized siccative oil-resin gel, such as disclosed in Canadian Patent No. 315,426, issued September 22, 1931. It will be understood, of course, other types of linoleum cement which are formed of oxidized and/or polymerized siccative oil and resin, as commonly manufactured in the industry, may be used if desired with satisfactory results.

Tricresyl phosphate is used as a plasticizer for the polyvinyl butyral. In its place, I may use dibenzyl sebacate, castor oil, dibutyl sebacate, "Paraplexes" (condensation polymers of sebacic acid and glycerol), "Duraplexes" (condensation polymers of phthalic anhydride, glycerol, and linoleic acid), or dialkyl phthalates.

"Kalvan" (calcium carbonate surface treated with 3% sulfonated oil) is used as a filler in the above compound; the cotton flock is used as a filler and as a reinforcing agent. In their place, any of the usual fillers may be used, such as whiting, "Silene" (surface treated calcium silicate), wood flour, cotton shearings, asbestine, cork particles, "Magnesol" (surface treated magnesium silicate), or the like. Any suitable pigments may, of course, be used in any desired quantity in order to impart a desired color to the floor or wall covering formed in accordance with my invention.

A floor covering so produced is highly resilient, flexible, and exhibits a high degree of elastic recovery. The material is capable of a 90° bend without breaking. Upon test, the covering so produced exhibited an initial indentation of 49.2% and a residual indentation of 2.4%. The indentation test was made in accordance with the Bureau of Standards Bulletin entitled "Building Materials and Structures Report BMS 14." The floor covering is not measurably affected by water, but it is slightly softened by twenty-four hours immersion in soap solution, and is softened by twenty-four hours immersion in a 2% solution of sodium hydroxide.

Example 2

| | Parts by weight |
|---|---|
| Linoleum cement | 75 |
| Polyvinyl butyral | 75 |
| Tricresyl phosphate | 10 |
| Dibenzyl sebacate | 20 |
| Oil-soluble phenol-aldehyde resin | 10 |
| "Kalvan" | 300 |

Floor and wall coverings may be made in the manner disclosed in Example 1. The covering so formed is resilient and flexible and is capable of bending about a 90° angle without breaking. It exhibits an initial indentation of 38.6% and a residual indentation of 3.2% in accordance with the test mentioned above.

Example 3

| | Parts by weight |
|---|---|
| Linoleum cement | 75 |
| Polyvinyl butyral | 75 |
| Tricresyl phosphate | 30 |
| Oil-soluble phenol-aldehyde resin | 20 |
| "Magnesol" | 125 |
| Cotton flock | 10 |

The above compound may be formed into a floor or wall covering in accordance with the method disclosed in Example 1. A floor or wall covering so produced is highly resilient and flexible and may be bent about a 90° angle without breaking. It exhibits an initial indentation of 19.1% and a residual indentation of 3.5%.

Example 4

| | Parts by weight |
|---|---|
| Linoleum cement | 100 |
| Polyvinyl butyral | 25 |
| Tricresyl phosphate | 7½ |
| Dibenzyl sebacate | 2½ |
| Oil-soluble phenol-aldehyde resin | 30 |
| Whiting | 225 |
| Wood flour | 60 |

A floor or wall covering may be made from the above compound in accordance with the procedure disclosed in Example 1. When made into a floor or wall covering, it is capable of receiving a 60° bend without breaking. It exhibits an initial indentation of 24.2% and a residual indentation of 4.2%.

I have described my covering as being calendered preferably on a backing composed of felt, burlap, or canvas. It will be understood suitable floor and wall coverings may be made within the scope of my invention which do not include a backing or support for the wear surface. Satisfactory coverings may be made of the various compounds described above in which backings need not be used.

My invention is not limited to a floor and wall covering which includes a wear surface calendered on a backing. The wear surface may be made in various forms. For example, it may be used as a granulated composition and strickled on a backing or it may be formed into sheets which are then cut into blocks and placed upon a backing. Any of the various means customarily employed in the manufacture of floor and wall coverings may be employed in the manufacture of floor and wall coverings of my invention.

Figure 2:
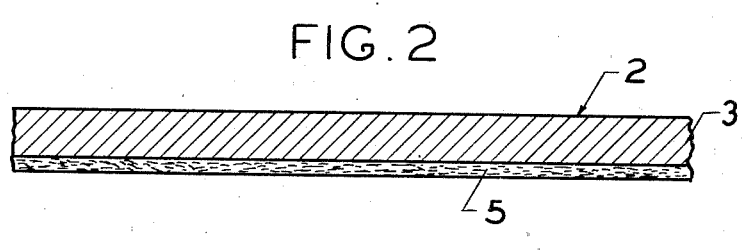
Figure 3:
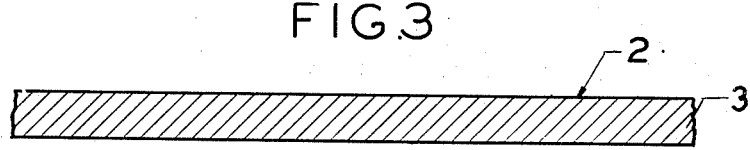

The attached drawing illustrates certain preferred embodiments of my invention in which Figure 1 is a sectional view of the floor covering of my invention and Figures 2 and 3 are sectional views of modifications thereof. Referring to the drawing, there is shown in Figure 1 a floor covering 2 which comprises a flexible, alkali-resistant, decorative wear surface 3 formed as described above integrally united with a burlap or canvas base 4 which serves as a support and carrier therefor. In Figure 2, the wear surface 3 is integrally united with a felt base 5 which serves the same purpose as base 4. The felt base 5 is preferably saturated with a suitable waterproofing compound, such as asphalt. Figure 3 illustrates the floor covering of my invention without a backing.

My invention provides a floor or wall covering which is attractive in appearance and possesses characteristics of toughness, flexibility, resiliency, and elastic recovery. It is highly resistant to water, dilute acids and alkalies, petroleum solvents, alcohols, grease or oil, and may be manufactured on equipment customarily used in the linoleum industry.

While I have described and illustrated certain preferred embodiments of my invention, it will be understood my invention is not limited thereto since it may be otherwise embodied within the scope of the following claims.

I claim:

1. As a new article of manufacture, a floor and wall covering which comprises a binder and a filler, the filler being present in an amount falling within the range of 150 to 500 parts by weight to each 100 parts by weight of binder, the binder comprising the reaction product of substantially equal parts of polyvinyl butyral containing not more than 20% residual polyvinyl alcohol and linoleum cement, and a heat-convertible oil-soluble phenol-aldehyde resin in an amount not more than 25 parts by weight based on each 100 parts by weight of the remaining binder ingredients.

2. As a new article of manufacture, a floor and wall covering which comprises a binder and a filler, the filler being present in an amount falling within the range of 150 to 500 parts by weight based on each 100 parts by weight of binder, the binder comprising the heat-reaction product of polyvinyl butyral containing not more than 20% residual polyvinyl alcohol, a plasticizer therefor in an amount falling within the range of 25 to 50 parts by weight based on each 100 parts by weight of polyvinyl butyral, linoleum cement, and a heat-convertible oil-soluble phenol-aldehyde resin in an amount not more than 25 parts by weight to each 100 parts by weight of linoleum cement and polyvinyl butyral.

3. As a new article of manufacture, a surface covering which comprises a binder and a filler, the binder comprising the heat reaction product of about 75 parts by weight of polyvinyl butyral containing not more than about 20% residual polyvinyl alcohol, about 75 parts by weight of a linoleum cement, about 18 to about 38 parts by weight of plasticizer for the polyvinyl butyral, and about 15 parts by weight of heat-convertible, oil-soluble, phenol-aldehyde resin.

4. As a new article of manufacture, a surface covering which comprises a binder and a filler, the binder comprising the heat reaction product of about 75 parts by weight of polyvinyl butyral containing not more than 20% residual polyvinyl alcohol, about 75 parts by weight of a linoleum cement, about 30 parts by weight of tricresyl phosphate, and about 15 parts by weight of a heat-convertible oil-soluble phenol-aldehyde resin, about 260 parts by weight of the filler being incorporated with said binder.

5. As a new article of manufacture, a floor and wall covering which comprises a binder and a filler, the filler being present in an amount falling within the range of 150 to 500 parts by weight based on each 100 parts by weight of binder, the binder comprising the heat-reaction product of polyvinyl butyral containing not more than 5% residual polyvinyl alcohol, plasticizer therefor in an amount falling within the range of 25 to 50 parts by weight based on each 100 parts by weight of polyvinyl butyral, linoleum cement in an amount equal to the amount of polyvinyl butyral, and a heat-convertible oil-soluble phenol-aldehyde resin in an amount not more than 25 parts by weight to each 100 parts by weight of linoleum cement and polyvinyl butyral.

6. As a new article of manufacture, a floor and wall covering which comprises a flexible alkali-resistant decorative wear surface and a backing integrally united therewith to serve as a support and carrier therefor, said wear surface comprising a binder and a filler, the binder comprising the heat-reaction product of approximately 100 parts by weight of a plasticized polyvinyl butyral containing not more than 20% residual polyvinyl alcohol, approximately 100 parts by weight of linoleum cement, a heat-convertible oil-soluble phenol-aldehyde resin in an amount not more than 25 parts by weight, and filler material in an amount falling within the range of 150 to 500 parts by weight based on each 100 parts by weight of binder.

WARREN STUBBLEBINE.

REFERENCES CITED

The following references are of record in the file of this patent:

UNITED STATES PATENTS

| Number | Name | Date |
| --- | --- | --- |
| 1,988,616 | Turkington | Jan. 22, 1935 |
| 2,396,093 | Haas | Mar. 5, 1946 |
| 2,402,911 | Novak | June 25, 1946 |
| 2,422,259 | Pratt | June 17, 1947 |

OTHER REFERENCES

Serial No. 301, 165, Putzer-Reybegg (A.P.C.), pub. Apr. 20, 1942.

Vinylite Resins, Aug. 14, 1943, published by Carbide and Carbon Chem. Corp., New York.

The Resinous Reporter, May 1943, pages 2, 3, published by the Resinous Products and Chem. Co., Philadelphia, Pa.